(12) United States Patent
Rosson

(10) Patent No.: US 11,086,003 B2
(45) Date of Patent: Aug. 10, 2021

(54) PASSIVE RADAR WITH ANALOGUE CANCELLATION OF THE STATIC COMPONENT

(71) Applicant: COMMISSARIAT À L'ÉNERGIE ATOMIQUE ET AUX ÉNERGIES ALTERNATIVES, Paris (FR)

(72) Inventor: Patrick Rosson, Grenoble (FR)

(73) Assignee: COMMISSARIAT À L'ÉNERGIE ATOMIQUE ET AUX ÉNERGIES ALTERNATIVES, Paris (FR)

(*) Notice: Subject to any disclaimer, the term of this patent is extended or adjusted under 35 U.S.C. 154(b) by 249 days.

(21) Appl. No.: 16/377,593

(22) Filed: Apr. 8, 2019

(65) Prior Publication Data
US 2019/0317203 A1   Oct. 17, 2019

(30) Foreign Application Priority Data

Apr. 11, 2018   (FR) ........................................ 1853175

(51) Int. Cl.
*G01S 13/00*   (2006.01)
*G01S 7/40*   (2006.01)
(Continued)

(52) U.S. Cl.
CPC .......... *G01S 13/003* (2013.01); *G01S 7/4021* (2013.01); *G01S 13/46* (2013.01); *G01S 13/522* (2013.01); *G01S 2013/462* (2013.01)

(58) Field of Classification Search
CPC ...... G01S 13/003; G01S 13/46; G01S 13/522; G01S 13/878; G01S 2013/462; G01S 7/354; G01S 7/4021
See application file for complete search history.

(56) References Cited

U.S. PATENT DOCUMENTS

2015/0355322 A1*  12/2015  Oshima ................. G01S 13/003
                                                              342/116
2016/0178741 A1*  6/2016  Ludlow .................. G01S 7/003
                                                              342/28
(Continued)

OTHER PUBLICATIONS

Search Report for French Application No. FR 1853175 dated Dec. 4, 2018.
(Continued)

*Primary Examiner* — Timothy X Pham
(74) *Attorney, Agent, or Firm* — Pearne & Gordon LLP

(57) ABSTRACT

A passive radar comprises a reception antenna for a signal transmitted by a non-cooperative transmitter, the received signal comprising a static contribution related to propagation of the signal transmitted through a multi-path propagation channel and a dynamic contribution related to propagation of echoes of the transmitted signal from a moving target. The passive radar also comprises a reception chain that includes an analogue-digital converter capable of outputting a digitised signal, a moving target detection unit, a digitised signal processing unit configured to determine an estimation of the static contribution during a calibration phase of the passive radar, a transmission chain that can output an analogue signal representative of the estimation of the static contribution, and a directional coupler configured to output the signal received during the calibration phase of the passive radar to the reception chain.

11 Claims, 3 Drawing Sheets

(51) Int. Cl.
    *G01S 13/46*    (2006.01)
    *G01S 13/522*    (2006.01)

(56) References Cited

U.S. PATENT DOCUMENTS

| | | | |
|---|---|---|---|
| 2017/0195003 A1 | 7/2017 | Rosson et al. | |
| 2018/0284220 A1* | 10/2018 | Bilik | G01S 7/40 |
| 2020/0166622 A1* | 5/2020 | Small | G01S 13/74 |

OTHER PUBLICATIONS

Bolvardi, Hasan et al. "Dynamic Clutter Suppression and Multitarget Detection in a DVB-TBased passive Radar" IN: IEEE Transactions on Aerospace and Electronic Systems, I Aug. 1, 2017, vol. 53, No. 4. pp. 1812-1825.

Berthillot, Clement et al. "BEM Reference Signal Estimation for an Airborne Passive Radar Antenna Array" N: IEEE Transactions on Aerospace and Electronic Systems, Dec. 1, 2017, vol. 53, No. 6, pp. 2833-2845.

Berger, C.R. et. I. "Signal Processing for Passive Radar using OFDM Waveforms" IN: JIEEE Journal of Selected Topics in Signal Processing, Mar. 2010, pp. 1-14.

Morelli, M. et al. "Synchronization techniques for orthogonal frequency division multiple access (OFDMA): A tutorial review" IN: Proceedings of the IEEE, Jul. 2007, vol. 95, No. 7, pp. 1394-1427.

Ozdemir, M.K. et. al. "Channel estimation for wireless OFDM systems" IN: IEEE Communication Surveys & Turtorials, Second Quarter 2007, vol. 9, No. 2, 99 18-48.

\* cited by examiner

PASSIVE RADAR WITH ANALOGUE CANCELLATION OF THE STATIC COMPONENT

CROSS-REFERENCE TO RELATED APPLICATIONS

This application claims priority from French Patent Application No. 1853175 filed on Apr. 11, 2018. The content of this application is incorporated herein by reference in its entirety.

TECHNICAL FIELD

The field of the invention is radar systems, called passive systems, that use signals transmitted by non-cooperative transmitters in order to detect and localise targets.

STATE OF PRIOR ART

A passive radar is a monitoring system capable of detecting (and possibly localising and estimating the speed and orientation) of moving targets. But unlike a classical active radar, a passive radar does not have a radiofrequency transmitter to illuminate its targets. This system is qualified as opportunistic in that it takes advantage of the presence of non-cooperative third party transmitters already present in the zone to be monitored. These transmitters may for example be radio broadcasting or telecommunication transmitters in an external context, and for example Wi-Fi access points in an internal context.

Passive radar receives the transmitted signal "routed" along multiple paths: the line of sight path (or direct path), paths passing through fixed reflectors (relief, vegetation, buildings, etc.) and finally paths due to the presence of moving reflectors of interest (the targets). The received signal is thus composed of a static contribution related to signal propagation through a multi-path propagation channel (i.e. related to propagation of the signal transmitted along the line of sight and propagation of signal echoes originating from fixed reflectors) and a dynamic contribution related to propagation of signal echoes coming from moving targets.

With reference to FIG. 1, in a scenario in which there is a single target C, determination of the-time difference between the line of sight path Tv and the path Tr reflected by the moving target C restricts the position of the target to an ellipse E with focal points at the positions of the transmitter TX and the passive radar RX. With an array of antennas at the passive radar, an agile radiation beam can be formed and the zone of interest can be scanned to find the angle of the reflected signal. The angle information can identify the point of the ellipse and therefore the position of the target. This assumes that the position of the passive radar, the position of the non-cooperative transmitter and the heading of the agile beam are known in the analysis coordinate system.

In this same single-target scenario, and with reference to FIG. 2, the use of several non-cooperative transmitters TX1, TX2, TX3 makes it possible to manage without an agile antenna in radiation. The position of the target C being searched for is at the intersection of ellipses E1, E2, E3, the focal points of which are firstly the position of the passive radar RX, and secondly the positions of the different non-cooperative transmitters TX1, TX2, TX3.

The presence of the powerful and continuous transmission in the line of sight but also its echoes from fixed reflectors is one of the major difficulties limiting the detection power of the radar. Since the targets generally have a small radar cross-section (RCS), the dynamic contribution has a very low amplitude compared with the static contribution. However, the different receptors associated with each of the antennas must be slaved on the strongest signal without saturating the reception systems.

This power difference can be compensated by spatially filtering the signals by means of the antenna array and then applying complex digital processing based on the principal of integration to extract the dynamic contribution from the received signal.

PRESENTATION OF THE INVENTION

The purpose of the invention is to disclose a technique to facilitate the target search step. To achieve this, it discloses a passive radar that comprises a reception antenna for a signal transmitted by a non-cooperative transmitter, the received signal comprising a static contribution related to propagation of the signal transmitted through a multi-path propagation channel and a dynamic contribution related to propagation of echoes of the transmitted signal coming from a moving target. The passive radar comprises a reception chain that includes an analogue-digital converter configured to output a digitised signal, a moving target detection unit starting from the digitised signal, and a digitised signal processing unit configured to determine an estimation of the static contribution during a calibration phase of the passive radar. The passive radar also has a transmission chain configured to output an analogue signal representative of the estimation of the static contribution, and a coupler configured to output to the reception chain the received signal during the calibration phase of the passive radar, and the received signal from which is subtracted the analogue signal representing the estimation of the static contribution during a usage phase of the passive radar, for detection of the moving target.

Some preferred but non-limitative aspects of this passive radar are as follows:
- the signal transmitted by the non-cooperative transmitter comprises sequences which are known to the passive radar, the digitised signal processing unit is configured during the passive radar calibration phase to synchronise the received signal with the transmitted signal starting from the known sequences and to determine an estimation of the multi-path propagation channel from the synchronised received signal and the known sequences;
- the transmission chain is configured to output the analogue signal representative of the estimation of the static contribution during reception of the known sequences and in which the moving target detection unit uses the digitised signal during reception of the known sequences, in the passive radar usage phase;
- the signal received from the transmitter is an OFDM signal;
- the coupler is a directive coupler;
- the reception antenna is a directive scanning antenna;
- the reception antenna receives signals transmitted by a plurality of non-cooperative transmitters, potentially in different frequency bands;
- it comprises a plurality of reception antennas each associated with a reception chain, a digitised signal processing unit, a transmission chain and a coupler.

BRIEF DESCRIPTION OF THE DRAWINGS

Other aspects, purposes, advantages and characteristics of the invention will be better understood after reading the detailed description given below of preferred embodiments of the invention, given as non-limitative examples, with reference to the appended drawings on which.

DETAILED PRESENTATION OF PARTICULAR EMBODIMENTS

The passive radar according to the invention is an opportunist system that takes advantage of the presence of non-cooperative third party transmitters already present in the zone to be monitored. This passive radar detects and determines the localisation (and even the orientation) of moving objects making use of signals transmitted by one or several non-cooperative transmitters of which the localisation relative to the radar is known, such as cellular telecommunication network transmitters for example such as 4G networks.

Figure 2:
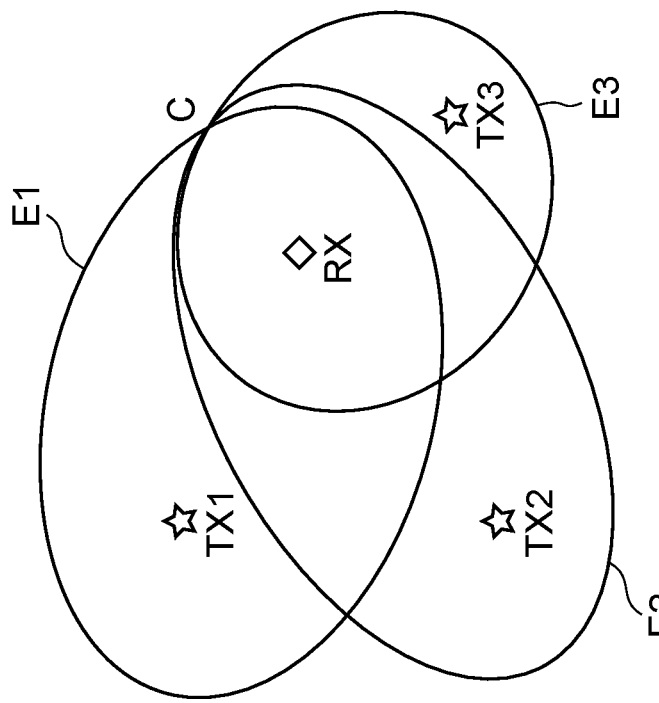
FIG. 2 represents the localisation of a target by the intersection of three ellipses.
Figure 1:
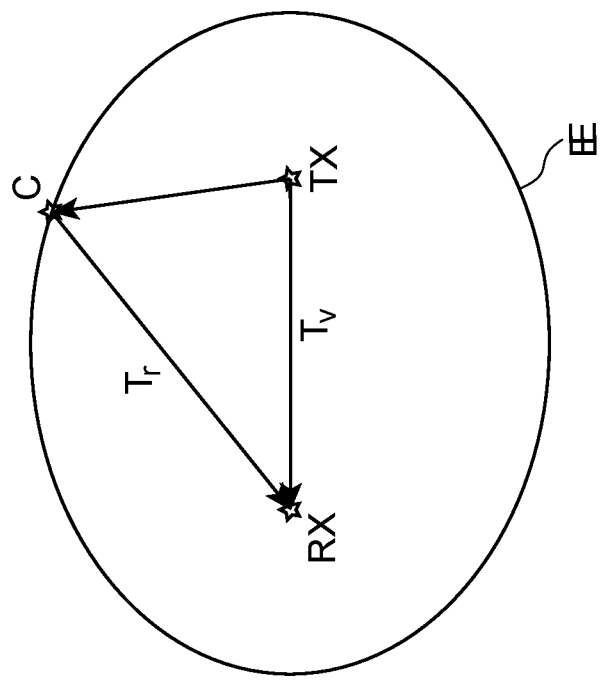
FIG. 1 illustrates an ellipse on which the position of the target is restricted due to the time difference between the line of sight path and the path reflected by a target.
Figure 3:
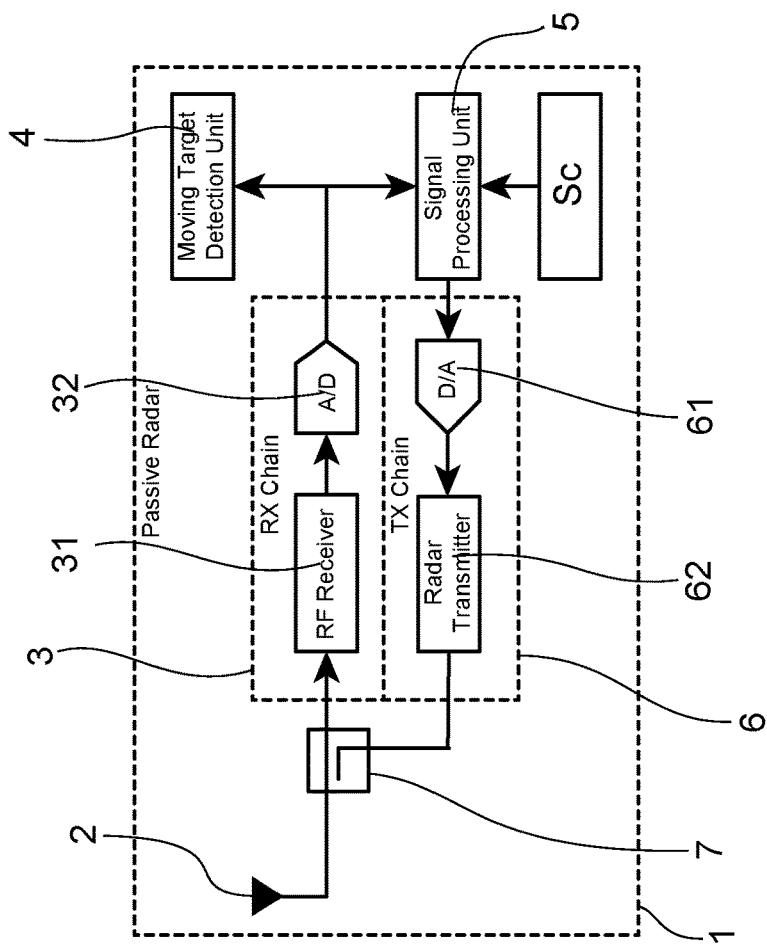
FIG. 3 is a diagram representing a transmitter and a passive radar according to the invention.
Figure 3:
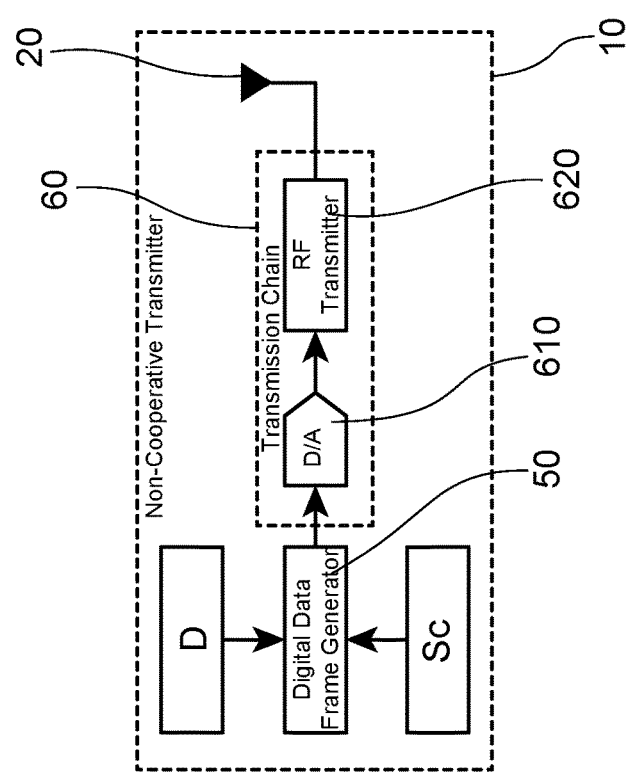

FIG. 3 shows a passive radar 1 conforming with the invention that makes use of a signal transmitted by a non-cooperative transmitter 10. The transmitter 10 comprises a digital data frame generator 50 that generate frames each containing a preamble Sc and useful data D, a transmission chain 60 that comprises a digital-analogue converter 610 and a radiofrequency transmitter 620 that transposes, filters and amplifies the analogue signal at the required frequency and a transmission antenna 20.

Correspondingly, the passive radar 1 comprises a reception antenna 2 of the signal transmitted by the transmitter 10 and a reception chain 3 that comprises a radio frequency receiver 31 that amplifies, filters and transposes the received signal and an analogue-digital converter 32 that outputs a digitised signal. This digitised signal is supplied to a moving target detection unit 4 that makes use of a conventional passive radar algorithm, for example by looking for the most probable time-Doppler frequency pair. An example of such an algorithm in the case in which the reception antenna 2 is an antenna array is presented in the paper by C. R. Berger et al., "Signal processing for passive radar using OFDM waveforms," J. Sel. Topics Signal Process., pp. 226-238, 2010.

The propagation channel between the transmitter 10 and the passive radar 1 can be composed of a direct path and a multi-path; and possibly a reflection on a target of interest. Thus, the received signal comprises a static contribution related to propagation of the transmitted signal through a multi-path propagation channel (i.e. related to propagation of the transmitted signal along the line of sight and propagation of signal echoes from fixed reflectors), and possibly a dynamic contribution related to propagation of signal echoes transmitted from one or several moving targets.

The passive radar 1 according to the invention also comprises a digitised signal processing unit 5 configured to determine an estimation of the static contribution during a passive radar contribution phase. It is also equipped with a transmission chain 6 (comprising a digital-analogue converter 61 and radar transmitter 62), synchronised on the same time-frequency base as the reception chain 3 (same digital clock and same local oscillator) and capable of outputting an analogue signal representative of the estimation of the static contribution. The passive radar 1 also comprises a coupler 7 configured to supply the following to the reception chain 3:

the received signal during the passive radar calibration phase, the received signal from which the analogue signal representative of the estimation of the static contribution is subtracted during a phase in which passive radar is used to detect moving targets.

The passive radar thus makes an analogue cancellation of the static contribution by generating a signal that corresponds to signals received when there are no moving targets, at the output from the directive coupler. The difference in power between the static contribution and the dynamic contribution is thus reduced (by the order of 30 to 40 dB), which improves the coding range (and therefore the precision during quantification of analogue signals) and reduces the filtering complexity used in the moving target detection unit 4.

The coupler 7 is preferably a directive coupler to prevent the analogue signal representative of the estimated static contribution that is subtracted from the received signal from being returned to the antenna 2. The directive coupler thus directionally injects the analogue signal representative of the estimated static contribution towards the reception chain, for example with 10 dB losses on this signal towards the reception chain and 30 dB losses on this signal towards the antenna.

In one prior embodiment, a circulator can be inserted between the antenna 2 and the coupler 7 so as to reduce the power of the analogue signal representative of the estimated static contribution that could be received by the antenna. The circulator comprises a port 1 connected to the antenna, a port 2 connected to the coupler and a port 3 connected to a load adapted to neutralise the energy of the analogue signal representative of the estimated static contribution that is output to the antenna.

In one implementation of the invention, the signal transmitted by the non-cooperative transmitter 10 comprises sequences which are known by the known passive radar (on a time duration and a frequency band), for example the preambles Sc. For example, it can be a wide band multi-carrier signal, for example an OFDM signal transmitted by a base station of a 4G LTE telecommunications network or by a Wi-Fi access point. It may also be a modulated narrow band single-carrier signal.

The digitised signal processing unit 5 is then configured during the passive radar calibration phase to make a time-frequency synchronisation of the received signal with the transmitted signal starting from the known sequences and to determine an estimation of the multi-path propagation channel from the synchronised received signal and the known sequences. With knowledge of the known sequences and the estimated multi-channel propagation channel, the unit 5 can generate a digital estimation of the static contribution during the reception of known sequences.

This numerical estimation is output to the transmission chain 6 that will then output the analogue signal representative of the estimated static contribution during the reception of the known sequences. The coupler 7 subtracts this analogue signal from the received signal, the result of the subtraction being digitised by the converter 32. The moving target detection unit 4 uses the signal digitised during the reception of the known sequences (i.e. over the duration of the known sequences) during the passive radar usage phase.

Figure 4:
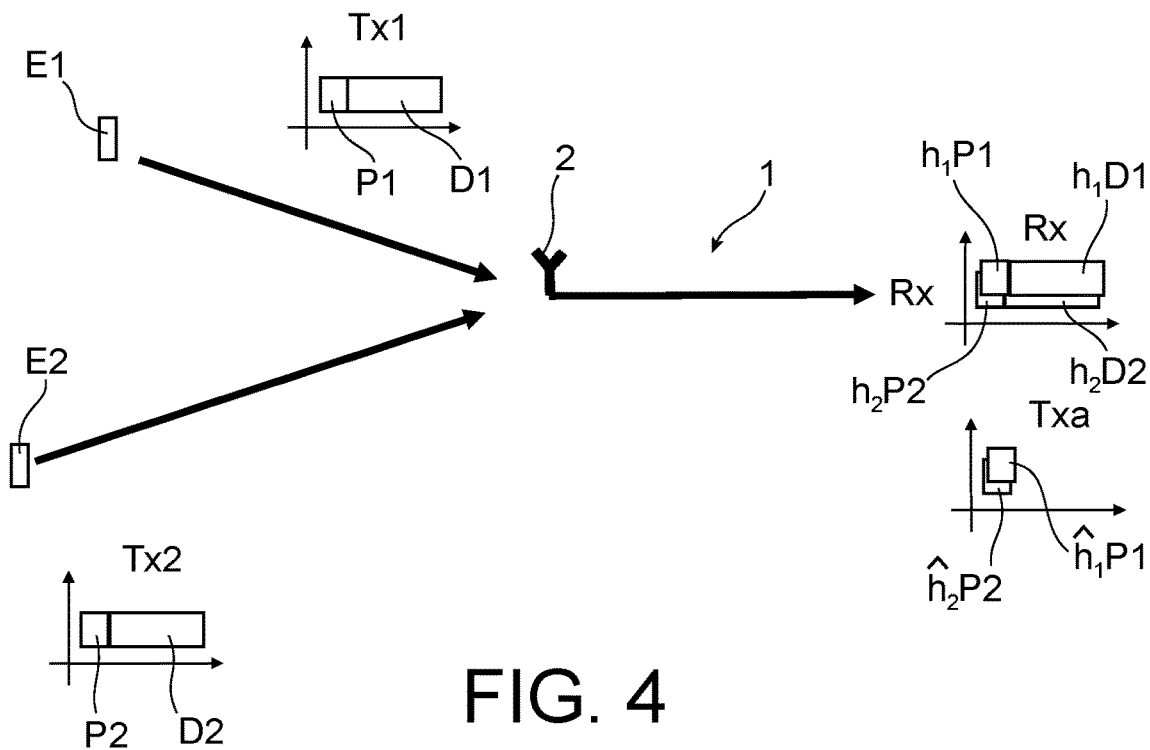
FIGS. 4 and 5 illustrate the calibration phase and the usage phase respectively of the passive radar according to the invention.

FIG. 4 illustrates the calibration phase of the passive radar according to the invention. In this example, the radar 1 receives the signals Tx1, Tx2 transmitted by two non-cooperative transmitters E1, E2 in the form of frames composed of a preamble P1, P2 and useful data D1, D2 respectively.

The received signal is designated Rx. The multi-path propagation channel between the transmitter E1 and the passive radar 1 has an impulse response h1 and the multi-path propagation channel between the transmitter E2 and the passive radar 2 has an impulse response h2. The passive radar 1 estimates each of the multi-path propagation channels to supply estimated impulse responses $\hat{h1}$, $\hat{h2}$ (in its-time-frequency base) and to generate the digital estimation of the static contribution Txa during the reception of the preambles with knowledge of preambles P1, P2 and the estimation of each of the multi-path propagation channels.

In one possible embodiment, the transmitters E1 and E2 use different frequency bands (for example bands attributed to different cellular telecommunications network operators) and the passive radar can switch between these frequency bands to listen to a single transmitter at a time.

In order to estimate each of the multi-path propagation channels, the passive radar makes a preliminary synchronisation, particularly a time frequency synchronisation in its time and frequency base, of the received signal with the signal transmitted by each transmitter. To achieve this, it uses the preambles contained in the frames transmitted by each transmitter. This synchronisation applies to a TFO ("Timing Offset") synchronisation made on the direct path (the strongest and the first arrival), a CFO ("Carrier Frequency Offset") synchronisation to compensate for the Doppler offset between the analogue signals at the radiofrequency transmitter 620 and the radiofrequency receiver 31 and an SFO ("Sampling Frequency Offset") synchronisation to compensate for the frequency offset between the digital signals at the input to the digital-analogue converter 610 and at the output from the analogue-digital converter 32. An example of such synchronisation is given in the paper by M. Morelli et al., "Synchronization techniques for orthogonal frequency division multiple access (OFDMA): A tutorial review", Proc. IEEE, vol. 95, No. 7, pp. 1394-1427, July 2007.

Once this synchronisation is complete, the passive radar estimates the corresponding propagation channel for each transmitter. Different estimating techniques can be implemented and examples can be found in the paper by M. K. Ozdemir et al., "Channel estimation for wireless OFDM systems," IEEE Communications Surveys & Tutorials, vol. 9, No. 2, pp. 18-48, Second Quarter 2007. Estimated impulse responses $\hat{h1}$, $\hat{h2}$ can be adjusted as a function of the error observed between sequences actually received h1P1, h2P2 and their estimations $\hat{h1}$ P1, $\hat{h2}$ P2.

Figure 5:
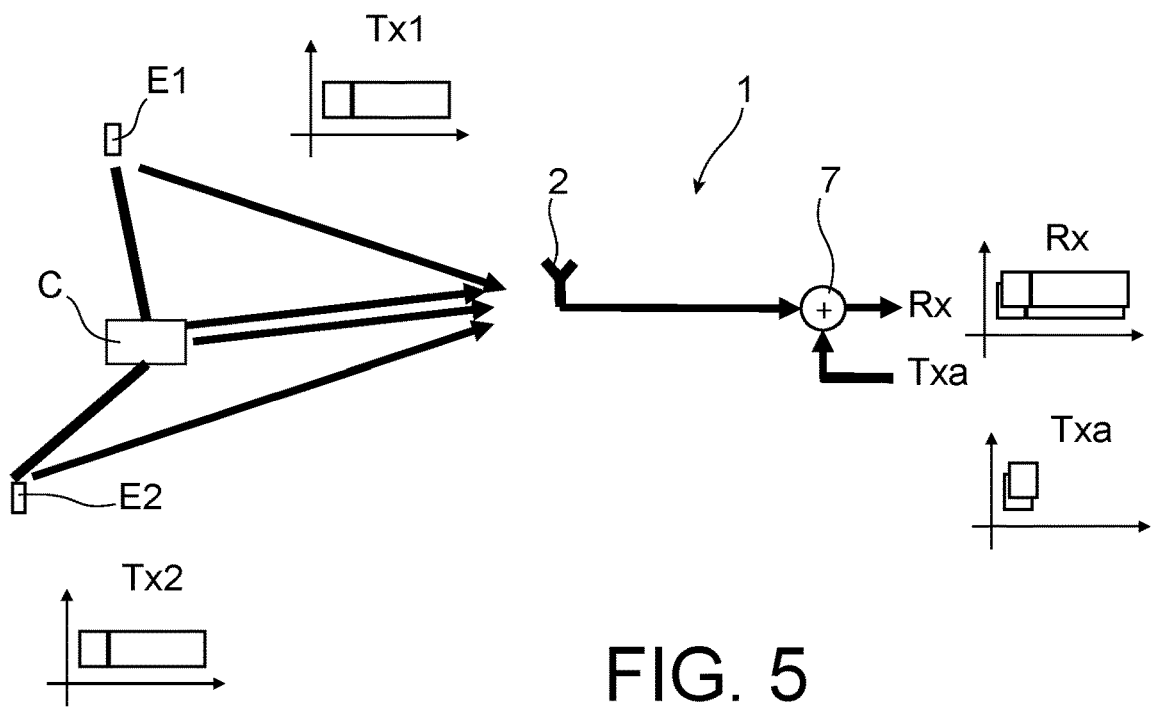

FIG. 5 illustrates the usage phase of the passive radar according to the invention for detection of targets C. The transmission system 6 of the passive radar generates the analogue signal representative of the estimation of the static contribution during the reception of the known sequences, and the coupler 7 subtracts this analogue signal from the signal received via the reception antenna 2.

In the case of a single transmitter, the signal received after analogue-digital conversion by a conventional passive radar is expressed in the frequency domain as follows: Sr=Pr.Tx.P.Rx, in which Pr is the preamble, Tx is the gauge of the transmitter 610, P is the propagation channel and Rx is the gauge of the receiver 31. With H that integrates the multi-path propagation channel aspect and gains and defects of the transmitter 620 and the receiver 31, we have Sr=Pr. H.

Assuming perfect time-frequency synchronisation, the signal received during the usage phase in the passive radar reception chain is Sr=Pr.H−Pr.Ĥ.Txa . . . C7.Rx=Pr.[H−Txa.Ĥ.C7.Rx], in which Txa is the gauge of the radar transmitter 62, Ĥ is the channel estimation and C7 represents losses induced by the coupler 7. The product Txa. C7. Rx can be estimated during a preliminary calibration or adaptively. It is thus possible to eliminate the influence of gains and defects of the transmitter 62 and the receiver 31 and losses of the directive coupler C7 by having $$\hat{H} = \frac{H}{Txa.C7.Rx},$$

which effectively reduces the power of the received signal.

The passive radar according to the invention preferably comprises a single reception antenna 2, and consequently a single reception chain. This single reception antenna may be a directional scanning antenna by means of which the zone of interest can be scanned and the target position on the ellipse can be identified. Alternatively, the single antenna can be used to receive signals transmitted by a plurality of non-cooperative transmitters. The target position can then be determined at the intersection of the ellipses associated with each transmitter.

The passive radar according to the invention may also comprise a plurality of reception antennas each associated with a reception chain 3, a digitised signal processing unit 5, a transmission chain 6 and a coupler 7. In other words, the generation and subtraction of an analogue signal to cancel the static component is made for each antenna. In the multi-antenna context, digital clocks (based on a single reference) and local oscillators are distributed to all reception and transmission chain.

The invention also relates to a method of detecting a moving target making use of the passive radar according to the invention. This method includes steps to:
determine an estimation of the static contribution during a calibration phase of the passive radar,
form an analogue signal representative of the estimation of the static contribution, and
supply the received signal during the calibration phase of the passive radar and the received signal from which the analogue signal representative of the estimation of the static contribution during a phase in which the passive radar is used to detect moving targets is subtracted, to the reception chain.

The invention claimed is:
1. A passive radar comprising:
a reception antenna configured to receive a signal transmitted by a non-cooperative transmitter, the received signal comprising a static contribution component related to propagation of the transmitted signal through a multi-path propagation channel and a dynamic contribution component related to propagation of echoes of the transmitted signal coming from a moving target,
a reception chain that includes a digital-analogue converter configured to output a digitised signal,
a moving target detection unit configured to detect the moving target by making use of the digitised signal,
wherein the passive radar further comprises:

a digitised signal processing unit configured to determine an estimation of the static contribution component of the received signal during a calibration phase of the passive radar, a transmission chain configured to output an analogue signal representative of the estimation of the static contribution component of the received signal, and a coupler configured to supply to the reception chain:
- the received signal during the calibration phase of the passive radar,
- the received signal from which the analogue signal representative of the estimation of the static contribution component of the received signal is subtracted during a usage phase of the passive radar in which the passive radar is used to detect a moving target.

2. The passive radar according to claim 1, wherein, the signal transmitted by the non-cooperative transmitter comprising sequences which are known by the passive radar, the digitised signal processing unit is further configured, during the calibration phase of the passive radar, to synchronise the received signal with the transmitted signal using the known sequences and to determine an estimation of the multi-path propagation channel from the synchronised received signal and the known sequences.

3. The passive radar according to claim 2, wherein the transmission chain is configured to output the analogue signal representative of the estimation of the static contribution component of the received signal during the reception of the known sequences and wherein the moving target detection unit is configured to use the digitised signal during the reception of the known sequences in the usage phase of the passive radar.

4. The passive radar according to claim 1, wherein the transmitted signal is an orthogonal frequency division multiplexing (OFDM) signal.

5. The passive radar according to claim 1, wherein the coupler is a directive coupler.

6. The passive radar according to claim 1, wherein a circulator is inserted between the reception antenna and the coupler to reduce the power of the analogue signal representative of the estimated static contribution component of the received signal received by the reception antenna.

7. The passive radar according to claim 1, wherein the reception antenna is a directive scanning antenna.

8. The passive radar according to claim 1, wherein the reception antenna is configured to receive signals transmitted by a plurality of non-cooperative transmitters.

9. The passive radar according to claim 8, wherein the reception antenna receives the signals transmitted by the plurality of non-cooperative transmitters in different frequency bands.

10. The passive radar according to claim 1, comprising a plurality of reception antennas each associated with a reception chain, a digitised signal processing unit, a transmission chain and a coupler.

11. A method of detection of a moving target using a passive radar comprising:
- a reception antenna configured to receive a signal transmitted by a non-cooperative transmitter, the received signal comprising a static contribution component of the received signal related to propagation of the transmitted signal through a multi-path propagation channel and a dynamic contribution component of the received signal related to propagation of echoes of the transmitted signal coming from the moving target,
- a reception chain that includes a digital-analogue converter configured to output a digitised signal,
- a moving target detection unit configured to detect the moving target by using of the digitised signal, wherein the method comprises the steps of:
- determining an estimation of the static contribution component of the received signal during a calibration phase of the passive radar,
- forming an analogue signal representative of the estimation of the static contribution component of the received signal, and
- outputting to the reception chain:
  - the received signal during the calibration phase of the passive radar,
  - the received signal from which the analogue signal representative of the estimation of the static contribution component of the received signal is subtracted during a usage phase of the passive radar in which the passive radar is used to detect the moving target.

* * * * *